United States Patent [19]

Gaier

[11] Patent Number: 5,225,171
[45] Date of Patent: Jul. 6, 1993

[54] APPARATUS FOR INTERCALATING LARGE QUANTITIES OF FIBROUS STRUCTURES

[75] Inventor: James R. Gaier, Strongsville, Ohio

[73] Assignee: The United States of America as represented by the Administrator of the National Aeronautics & Space Administration, Washington, D.C.

[21] Appl. No.: 735,548

[22] Filed: Jul. 24, 1991

Related U.S. Application Data

[62] Division of Ser. No. 608,493, Nov. 2, 1990, Pat. No. 5,073,412.

[51] Int. Cl.$^5$ ............................................. B01J 19/28
[52] U.S. Cl. ..................................... 422/209; 422/136
[58] Field of Search ..................... 422/136, 137, 209; 252/502

[56] References Cited

U.S. PATENT DOCUMENTS

| | | | |
|---|---|---|---|
| H641 | 6/1989 | McQuillan et al. | 427/299 |
| 4,293,450 | 10/1981 | Vogel | 252/503 |
| 4,565,649 | 1/1986 | Vogel | 252/503 |
| 4,604,276 | 8/1986 | Oblas et al. | 423/449 |
| 4,632,775 | 12/1986 | Kalnin et al. | 252/502 |
| 4,634,546 | 1/1987 | Kalnin et al. | 252/506 |
| 4,683,062 | 7/1987 | Krŏvák et al. | 422/209 |
| 4,749,514 | 6/1988 | Murakami et al. | 252/500 |
| 4,849,183 | 7/1989 | Kuriyama | 422/136 |
| 4,895,713 | 1/1990 | Greinke et al. | 423/448 |
| 4,915,925 | 4/1990 | Chung | 423/447.1 |
| 4,931,213 | 6/1990 | Cass | 252/507 |

Primary Examiner—Robert J. Warden
Assistant Examiner—E. Leigh Dawson
Attorney, Agent, or Firm—Gene E. Shook; James A. Mackin; Guy M. Miller

[57] ABSTRACT

Apparatus for intercalating large quantities of fibrous structures uses a rotatable reaction chamber containing a liquid phase intercalate. The intercalate liquid phase is controlled by appropriately heating, cooling or pressurizing the reaction. Rotation of the chamber containing the fiber sample ensures total submergence of the fiber during intercalation. Intercalated graphite fibers having metal-like resistivities are produced and are conceivably useful as electrical conductors.

2 Claims, 2 Drawing Sheets

APPARATUS FOR INTERCALATING LARGE QUANTITIES OF FIBROUS STRUCTURES

ORIGIN OF THE INVENTION

The invention described herein was made by an employee of the U.S. Government and may be manufactured and used by or for the Government for governmental purposes without the payment of any royalties thereon or therefor.

STATEMENT OF CODEPENDENCY

The application is a division of application Ser. No. 608,493 which was filed, Nov. 2, 1990, and issued as U.S. Pat. No. 5,073,412.

TECHNICAL FIELD

The invention relates generally to intercalating materials. The invention is particularly directed to apparatus for intercalating large quantities of fibrous compounds including silicon, carbon and ceramics.

There is an enormous need in the current technology for apparatus to intercalate large quantities of graphite compounds. Such compounds are conceivably immensely useful as electrical conductors, This goal is apparently within reach because resistivities similar to silver have been obtained with $AsF_5$ intercalated highly graphitized fibers.

Most prior art apparatus for developing intercalated graphite fibers envision embedding them either in a metal or polymeric matrix. In the case of graphite fibers (typically chopped or milled) intercalated with polymeric resins, problems with resistivity arise which appear to be due to intercalate diffusing out of the fibers. The most serious problem is that the resistivity of this type of composite is fundamentally limited by percolation of current through the matrix, and so even the lowest resistivities reported for this type of composite are on the order of $\Omega$-cm. For many power applications, such as cabling and antennae, metal-like resistivities ($\mu\Omega$ cm) will be required.

There is no known or reported apparatus to intercalate high volume graphite fibers. In the prior art, small sections of fiber tow, a few inches long, are generally sealed in a glass container along with the intercalate, and heated to the reaction temperature. The reaction bulb is then shattered and the intercalated fibers removed. Thus, the prior art procedures are only applicable to laboratory scale reactions. In this venue, it is not practical to intercalate more than a few tens of grams of fibers this way. Processing large volumes of graphite fibers has thus proven to be unwieldy.

It is, therefore, the objective of this invention to provide apparatus for intercalating fibrous compounds.

Another object of the invention is to provide an intercalated graphitized material having metal-like resistivities.

Yet another object of the invention is to provide a suitable intercalate for high temperature thermal conductive graphite composites.

Still another object of the invention is to provide an apparatus for intercalating large volumes of fibrous compounds.

Moreover, an important advantage of the present invention is that it allows the intercalation of large quantities of fibers.

Another important advantage of the invention is that the intercalated material can be useful in catalytic and electrochemical applications, hydrogen isotope separation, and latent heat storage.

Still further, another important advantage of the invention is the resultant 2 to 10 times higher electrical conductivity of the intercalated graphitized material over the untreated material.

Yet another important advantage of the present invention is the high thermal conductivity of the intercalated graphitized composite structures.

BACKGROUND ART

U.S. Pat. No. 4,565,649 to Vogel discloses methods of preparing intercalated graphite compounds wherein the graphite materials are combined with an acid halide system in an inert atmosphere. The intercalated filaments obtained are washed with distilled water and dried.

U.S. Statutory Invention Registration No. H641 to McQuillan et al disclosed a method of intercalating a metal chloride into graphite fibers by placing the fibers in a tube with the intercalant, adding chlorine gas and sealing the tube under vacuum.

U.S. Pat. No. 4,849,183 to Kuriyama discloses the use of rotatable, cylindrical reaction vessel provided with an inlet for a reaction mixture and driving means rotating the vessel around an axis.

U.S. Pat. No. 4,749,514 to Murakami et al disclosed a process for the preparation of graphite intercalation compounds wherein a graphitized film or sheet with a large surface area is placed in a reaction tube, evacuated to vacuum and heated to form an intercalated compound. See col. 4, lines 60–63. The reference discloses a number of examples wherein the intercalant is introduced in various forms (1) the vapor phase (halogen gases—F2, BR2, ICl, IBr), (2) in the liquid phase and (3) dissolved in a solvent (e.g. metal halides).

DISCLOSURE OF THE INVENTION

According to the present invention, a fibrous compound in the form of a mat or cloth is rolled up and inserted into a rotatable chamber. The chamber is then sealed and evacuated. A liquid phase intercalate is introduced into the chamber in sufficient quantity so as to totally submerge the material and thereby cause a reaction therebetween. The resulting intercalated material has a low metal-like resistivity and, thus, is useful for power application.

BRIEF DESCRIPTION OF THE DRAWING

The foregoing, as well as other objects, features and advantages of this invention will become more apparent from the following detailed description when taken in conjunction with the appended figures in which.

BEST MODE FOR CARRYING OUT THE INVENTION

Development of intercalated highly graphitized fibers with low resistivities is achieved by using three grades of pitch based on graphite fibers, Amoco P-55, P-75 and P-100 and their bromine intercalation compounds. The starting fibers are selected based upon their ability to form stable, well characterized intercalation compounds with bromine. Commercial availability of the starting material in spools of indefinite length is also an important selection criteria. The Amoco fibers range in resistivity from 950 $\mu\Omega$ cm, for pristine P-55 to 50 $\mu\Omega$ cm for bromine intercalated P-100.

The subject fibers are first woven into a cloth prior to intercalation. Six thousand filament strands of P-55 and P-75 fibers are woven into 11×11 yarns/inch (4.3×4.3 yarns/cm) five-harness satin weave by Mutual Industries, Inc. The resulting materials has an areal weight of about 300 g/m². The P-100 is more brittle and, thus, requires different handling procedures. Accordingly, only 2000 filament strands of the P-100 are woven into 10×10 yarns/inch (4×4 yarns/cm) in a plain weave by Fabric Development, Inc. Hence, a looser fabric having less filament breakage results with an areal weight of about 270 g/m².

Figure 1:
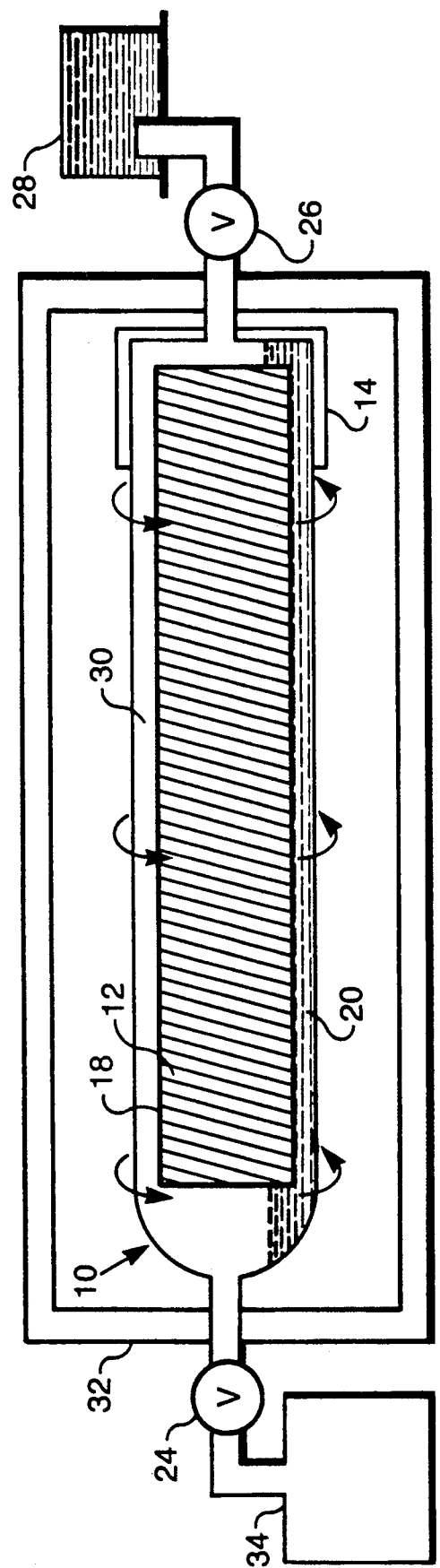
FIG. 1 is a schematic view of the high volume rotatable intercalation apparatus according to the present invention.

Referring now to FIG. 1, according to the present invention, a reaction chamber 10 receives a rolled fibrous sample 12 to be intercalated. Each fiber type is cut into a 38×38 inch (96×96 cm) cloth or mat and, then, rolled into a predetermined configuration for insertion into chamber 10. The inlet end 14 of chamber 10 has a diameter of four (4) inches (10 cm) for receiving sample 12 to be intercalated. Accordingly, the rolled fiber radius must be large enough not to cause appreciable fiber damage, but small enough to fit within the reaction chamber 10.

Moreover, chamber 10, which forms a reservoir 20 therein for containing the intercalate, is preferably made of a material inert to the intercalate, such as glass or quartz in the present invention. Other materials, however, may be used. For example, aluminum may be used in the case of intercalates comprising fluorinated compounds.

Figure 2:
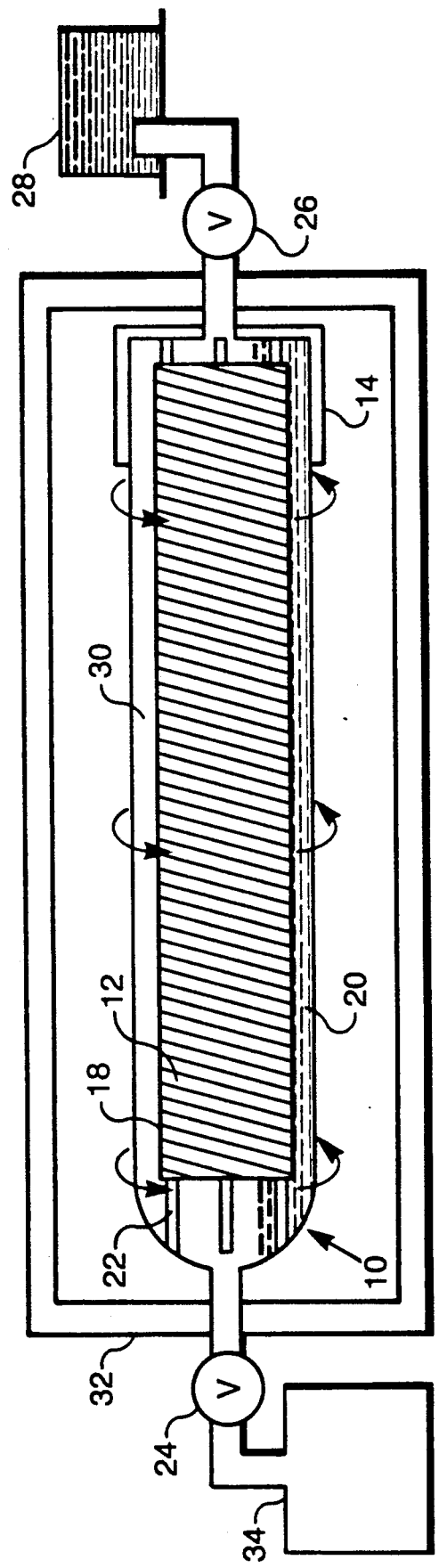
FIG. 2 is a schematic view of a rotatable intercalation apparatus suitable for fiber tows.

Turning next to FIG. 2, fiber tow samples 12, alternatively, must be first wound around a mandril 18 somewhat smaller than the reaction chamber 10 and inlet end 14. Mandril 18, having fiber tows 12 thereon, is inserted into the inlet end 14 of the reaction chamber 10. Mandril 18 is securely attached to chamber 10 at both inlet end 14 and the opposite end by a plurality of fingers 22. Hence, in this embodiment, mandril 18 and reaction chamber 10 share a common rotational axis. In this case, enough intercalate is added to the reaction chamber 10 such that space 20 between the bottom of mandril 18 supporting fiber tows 12 and the reaction chamber 10 is fully filled with fluid.

The inlet end 14 of chamber 10 is then sealed and the chamber evacuated to about $10^{-3}$ torr through control valve 24 connected to a vacuum pump 34. Intercalate in the liquid phase is then introduced through valve 26 into reaction chamber 10.

In the preferred embodiment, a bromine intercalate is used with the graphitized fiber. However, other materials may be used including a halogen (such as IBr, ICl, etc.), a metal halide (such as AsF$_5$, SbCl$_5$, etc.), a reactive metal (Li, K, Rb, Cs, etc.) or any combination thereof. Enough intercalate is added to thoroughly soak the sample during the intercalation process so that samples 12 are submerged several times under the bromine. The method of adding the intercalate to the reaction chamber 10 depends upon the specific intercalate. If the intercalate is a liquid at room temperature (i.e., bromine), then chamber 10 is first pump vacuum ($10^{-3}$ torr) level. The sensitivity of the intercalate to the air will dictate how stringent this requirement is. A valve 26 is opened and the intercalate reservoir 28 is raised above the level of the reaction chamber 10, such that it drains by gravity flow into chamber 10.

Depending upon the subsequent reaction temperature, additional vacuum may be applied after injection of the intercalate so that the pressure of the intercalate vapor 30 will not burst reaction chamber 10.

On the other hand, if the intercalate is a solid at room temperature (i.e., lithium), bars or chunks of the intercalate are added after the fiber is added to chamber 10. This must be done in a controlled environment 32 if the intercalate is air sensitive and back-filled with an inert gas. The reaction chamber 10 is sealed and then evacuated to minimize pressure build-up upon heating to achieve the liquid state. Thus, during the intercalation process, intercalate liquid phase control is an important step in the process. Chamber 10 is then rotated so that all parts of the fiber sample are submerged at some point during the process. This, then, results in the fibrous structures being in continual contact with the intercalate. Moreover, this rotational submergence causes a reaction between sample 12 and intercalate and, thus, culminates in intercalation. Capillary action causes the bromine to soak into sample 12. Thus, the conditions are intermediate between a vapor phase and a liquid phase intercalation.

At the conclusion of the reaction, excess bromine intercalate is removed from chamber 10. The preferred method for removing the intercalate is flushing chamber 10 with an inert gas stream, although other procedures in the art may prove feasible. Subsequently, intercalated sample 12 is purged of intercalate residue. In the present invention, this is accomplished by rinsing sample 12 with bromoform, a solvent, when bromine intercalate is used. This process is complete when the residual solvent is colorless. The bromoform lubricates the graphite filaments, leaving sample 12 very pliable. Sample 12 is then removed from chamber 10 and laid out on a flat surface to dry in ambient air. At room temperature under bromine atmosphere, there is bromine mass uptake of about 44% of the carbon mass, or about 130 grams of bromine per cloth. The final intercalated fiber has about 18% bromine by mass, or about 55 grams per cloth.

Turning finally to the resistivity of the composites fabricated from the intercalated compounds by Rohr Industries, Inc., the R. F. Eddy current resistivities (theoretical and Four Point Resistivity test comparative date also shown) of samples 12 are summarized in the table below:

TABLE I

| Measurement | Graphite Composite Resistivities | | | | | |
| --- | --- | --- | --- | --- | --- | --- |
| | P-55 | | P-75 | | P-100 | |
| | pris | Br$_2$ | pris | Br$_2$ | pris | Br$_2$ |
| Fiber Resistivity, $\mu\Omega$ cm | 950 | 370 | 760 | 380 | 430 | 67 |
| Calculated Resistivity, $\mu\Omega$ cm | 3380 | 1370 | 2590 | 960 | 1030 | 280 |
| R.F. Eddy Current Resistivity, $\mu\Omega$ cm | 4320 | 2020 | 3920 | 1190 | 2010 | 490 |
| Four-Point Resistivity (0°), $\mu\Omega$ cm | 4370 | 2040 | 4010 | 1300 | 1530 | 650 |

The overall trend is for the composite resistivity to be dominated by the fiber type. Thus, the most conductive fibers (Bromine intercalated P-100) result in the most conductive composites. Moreover, composite resistivity is dominated by fiber resistivity, lowering the intercalation in accordance with the present invention, results in lowering the composite resistivity.

While the invention has been described with reference to certain preferred embodiments thereof, those skilled in the art will appreciate that various modifications, changes, omissions and substitutions may be made without departing from the spirit of the invention. It is intended, therefrom, that the invention be limited only by the scope of the following.

I claim:

1. Apparatus for intercalating fiber tows comprising
   a plurality of fiber tows;
   a mandril having an outer surface for supporting said fiber tows;
   a horizontally disposed reaction chamber for receiving said mandril with said fiber tows thereon, having an inlet and an outlet end, said mandril being attached to said chamber at both said inlet and outlet ends, said chamber having an inner surface spaced from said outer surface of said mandril when said mandril is in a horizontal position in said chamber;
   a supply if intercalate;
   means for delivering an amount of said intercalate from said supply into said chamber such that the space between the bottom portion of the outer surface of said mandril and said inner surface of said chamber is filled with said intercalate;
   means for evacuating said chamber with said mandril and said fiber tows therein prior to delivery of said intercalate as well as subsequent to said delivery;
   means for rotating said chamber and a mandril therein about the longitudinal axis thereof so that all parts of the fiber tows on said mandril are submerged at some point during said rotation so that said fiber tows are in continuous contact with said intercalate as said chamber rotates whereby the resulting rotational submergence causes a reaction between the fiber tows and the intercalate culminating in intercalation.

2. The apparatus of claim 1 wherein said chamber is made of a material selected from the group consisting of
   inert material;
   aluminum;
   any combination thereof.

* * * * *